US011938619B2

(12) United States Patent
Han et al.

(10) Patent No.: US 11,938,619 B2
(45) Date of Patent: Mar. 26, 2024

(54) ADJUSTABLE SEEDLING PICK-UP END EFFECTOR FOR AUTOMATICALLY TRANSPLANTING PLUG SEEDLINGS

(71) Applicant: JIANGSU UNIVERSITY, Zhenjiang (CN)

(72) Inventors: Lvhua Han, Zhenjiang (CN); Menghan Mo, Zhenjiang (CN); Haorui Ma, Zhenjiang (CN); Hanping Mao, Zhenjiang (CN); Jianping Hu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/012,982

(22) PCT Filed: Mar. 18, 2022

(86) PCT No.: PCT/CN2022/081701
§ 371 (c)(1),
(2) Date: Dec. 27, 2022

(87) PCT Pub. No.: WO2022/194280
PCT Pub. Date: Sep. 22, 2022

(65) Prior Publication Data
US 2023/0247936 A1   Aug. 10, 2023

(30) Foreign Application Priority Data

Mar. 17, 2021   (CN) .......................... 202110284233.9

(51) Int. Cl.
B25J 15/08 (2006.01)
A01C 11/02 (2006.01)
(52) U.S. Cl.
CPC ............. B25J 15/08 (2013.01); A01C 11/025 (2013.01)

(58) Field of Classification Search
CPC ...... B25J 15/08; B25J 15/0071; B25J 15/022; B25J 15/0206; A01C 11/025; A01C 11/006; A01G 9/083
See application file for complete search history.

(56) References Cited

U.S. PATENT DOCUMENTS

2002/0070150 A1  6/2002  Keller et al.
2021/0204490 A1  7/2021  Bartrom

FOREIGN PATENT DOCUMENTS

CN    102342207 A  *  2/2012
CN    102934555 A     2/2013
(Continued)

Primary Examiner — Stephen A Vu
(74) Attorney, Agent, or Firm — Bayramoglu Law Offices LLC

(57) ABSTRACT

An adjustable seedling pick-up end effector for automatically transplanting plug seedlings is provided includes two clamping fingers installed symmetrically along a direction of a center line, support frames respectively connected adjustably to the clamping fingers, and a mechanical arm fixedly connected to the support frames. The mechanical arm is constructed to drive a clamping pin mechanism to execute actions of prying, grabbing, and quickly releasing the plug seedlings, and the adjustment of the opening degree and the clamping angle of the clamping pin mechanism is realized by adopting the adjustably connected support frames. The end effector can be actively opened and closed to grab and release the plug seedlings, provide a larger space to accommodate the plug seedlings so as not to damage the seedlings, and adjust the opening degree and the clamping angle, which can meet the seedling pick-up requirements for automatic transplanting of plug seedlings of various specifications.

8 Claims, 8 Drawing Sheets

(56) References Cited

FOREIGN PATENT DOCUMENTS

| | | | | |
|---|---|---|---|---|
| CN | 102948292 | A | 3/2013 | |
| CN | 103004342 | A | 4/2013 | |
| CN | 202979645 | U | 6/2013 | |
| CN | 106900356 | A * | 6/2017 | ............... A01G 2/30 |
| CN | 108124652 | A * | 6/2018 | ............. A01G 9/083 |
| CN | 109392386 | A * | 3/2019 | ............. A01C 11/02 |
| CN | 112936331 | A | 6/2021 | |
| IN | 102696322 | A | 10/2012 | |
| WO | 2020102830 | A1 | 5/2020 | |

* cited by examiner

ADJUSTABLE SEEDLING PICK-UP END EFFECTOR FOR AUTOMATICALLY TRANSPLANTING PLUG SEEDLINGS

CROSS REFERENCE TO THE RELATED APPLICATIONS

This application is the national phase entry of International Application No. PCT/CN2022/081701 filed on Mar. 18, 2022, which is based upon and claims priority to Chinese Patent Application No. 202110284233.9 filed on Mar. 17, 2021, the entire contents of which are incorporated herein by reference.

TECHNICAL FIELD

The present disclosure belongs to the field of agricultural machinery, and more particularly relates to an adjustable seedling pick-up end effector for automatically transplanting plug seedlings.

BACKGROUND

At present, most vegetable crops are planted by transplanting plug seedlings. Automatic transplanting of plug seedlings requires the development of a clamping mechanism that is adapted to the agronomic characteristics of seedlings. Currently, seedling pick-up mechanisms and end effectors with a variety of operation modes such as clamp type and ejection type have been developed. Such research works have made important contributions to the application of automatic plug seedling transplanters in China. The seedling pick-up end effector is the key component of an automatic clamping mechanism, and is related to whether the seedlings can be picked up according to the requirements and whether the seedlings can be released in a suitable posture. There are a great variety of plug trays used for production in China, including those of specifications such as 72 cells, 105 cells, and 128 cells, which requires the seedling pick-up and dropping end effector to be not only small in structure to achieve a clamping operation that is adapted to the characteristics of plug seedlings, but also flexible and adjustable to meet the requirements of automatic seedling pick-up from plug trays of various specifications for transplanting.

However, in existing seedling pick-up and dropping end effectors, the structure of the seedling pick-up and dropping device is not adjustable, and the mechanical fingers realize the grasping of the root lumps by the action of the tightening spring, but do not have an active grasping function. Some existing end effectors can complete the action of picking up seedlings with the aid of other external devices. For example, the seedling pick-up action of clamping and extracting the seedlings from the plug tray and the seedling dropping action of releasing and pushing out the seedlings can be realized by controlling a solenoid valve to control the retraction and extension of a cylinder. However, during seedling pick-up and dropping, it is necessary to adjust the dropping speed by controlling the air intake of the cylinder, which needs to be strictly in line with the action speed of the seedling pick-up mechanism, otherwise the seedling pick-up action of clamping and extracting the seedlings from the plug tray and the seedling dropping action of releasing and pushing out the seedlings cannot be completed as expected. Some other seedling pick-up end effectors similar to claws have a simple structure, but the fingers are fixed, and the seedling pick-up is realized only by the retraction and extension of the clamping pins in the mechanical fingers, which leads to poor flexibility and cannot avoid damage to the seedlings. Therefore, it is necessary to further develop a seedling pick-up end effector with a strong adaptability and a flexible and adjustable structure size to meet the requirements of plug seedling transplanting.

SUMMARY

In view of the above technical problems, the present disclosure provides an adjustable seedling pick-up end effector for automatically transplanting plug seedlings. The adjustable seedling pick-up end effector is suitable for use in combination with a seedling pick-up mechanism of an existing automatic transplanter. An eccentric slider-rocker mechanism which has a limiting effect and can be folded inward and outward is constructed to drive a clamping pin mechanism to execute actions of prying, grabbing and quickly releasing the plug seedlings, and the adjustment of the opening degree and the clamping angle of the clamping pin mechanism is realized by adopting an adjustable slotted hole and a locking device, allowing for the automatic transplanting of plug seedlings of various specifications. The adjustable seedling pick-up end effector can be actively opened and closed to grab and release the plug seedlings, and can provide a larger space to accommodate the plug seedlings so as not to damage the seedlings, and also can adjust the opening degree and the clamping angle, which can meet the seedling pick-up requirements for automatic transplanting of plug seedlings of various specifications.

The following technical solutions are employed in the present disclosure. An adjustable seedling pick-up end effector for automatically transplanting plug seedlings is provided, including two clamping fingers, support frames, and a mechanical arm, where the clamping fingers are installed symmetrically along a direction of a center line; one end of each of the support frames is connected to an upper end of a respective one of the clamping fingers, the other end of each of the support frames is connected to a respective one of rockers of the mechanical arm, and a slotted hole is provided on the end of each of the support frames connected to the respective one of the clamping fingers for adjusting a distance between the two clamping fingers; the mechanical arm includes connecting rods, the rockers, a bracket, helical limiting rods, a slider, and a linear motion unit; the slider is connected to a movable element of the linear motion unit along the direction of the center line; the connecting rods are respectively arranged on two sides of the slider, one end of each of the connecting rods is hingedly connected to the slider, the other end of each of the connecting rods is hingedly connected to one end of a respective one of the rockers, and the other end of each of the rockers is hingedly connected to the bracket; the helical limiting rods each extend through the bracket in a manner of a helical pair along a direction parallel to the center line, and are configured to limit a movement space for closing of the connecting rods; when the linear motion unit drives the slider to move upward, the connecting rods drive the rockers to cause the two clamping fingers to close inward; and when the linear motion unit drives the slider to move downward, the connecting rods drive the rockers to cause the two clamping fingers to open outward.

In the above solution, each of the support frames includes a cover plate, a support base, locking bolts, a locking nut, and an L-shaped connecting plate; the cover plate and the support base are respectively arranged on two sides of the upper end of the respective one of the clamping fingers, and are connected by the locking bolts to fasten the respective one of the clamping fingers; one end surface of the L-shaped connecting plate is provided with the slotted hole, and the other end surface of the L-shaped connecting plate is connected to the respective one of the rockers of the mechanical arm; a connecting end of the support base is passed through the slotted hole, and is connected to the L-shaped connecting plate by tightening of the locking nut.

In the above solution, one end of each of the connecting rods is hingedly connected to the slider through a third pin shaft, the other end of each of the connecting rods is hingedly connected to one end of the respective one of the rockers through a first pin shaft, and the other end of each of the rockers is hingedly connected to the bracket through a second pin shaft.

In the above solution, the clamping fingers are a clamping pin mechanism configured to be inserted into a root lump or a clamping claw configured to clamp a stem of a plug seedling.

In the above solution, the cover plate and the support base are respectively provided with slot holes which form an identical shape to the upper end of the respective one of the clamping fingers to fasten the upper end of the respective one of the clamping fingers.

In the above solution, a size of a locking end surface of the locking nut is larger than a size of the slotted hole on the L-shaped connecting plate.

Further, the L-shaped connecting plate is fixedly connected to the respective one of the rockers of the mechanical arm.

In the above solution, the mechanical arm is an eccentric slider-rocker mechanism which is configured to be closed and opened along the center line with the bracket as a stationary frame, the slider as a driving part, and the connecting rods and the rockers as driven parts, and is configured to limit a closure ultimate position of the connecting rods by a limiting function of the helical limiting rods.

In the above solution, the clamping fingers are respectively connected to the rockers of the mechanical arm through the support frames, and are configured to be opened and closed under driving of the slider to perform actions of grabbing and releasing the plug seedling.

In the above solution, the linear motion unit is a linear motion cylinder, a hydraulic cylinder, a linear motor, or an electric linear actuator.

Compared with the prior art, the present disclosure has the following beneficial effects:
1. The mechanical arm of the present disclosure is an eccentric slider-rocker mechanism which can be folded inward and outward to be closed and opened to drive the clamping pin mechanism to execute actions of prying, grabbing and quickly releasing the plug seedlings so as to achieve active opening and closing to grab and release the plug seedlings, and provide a larger space to accommodate plug seedlings so as not to damage the seedlings.
2. The present disclosure adopts an adjustable slotted hole and a locking device to realize the adjustment of the opening degree and the clamping angle of the clamping pin mechanism, which can meet the seedling pick-up requirements for automatic transplanting of plug seedlings of various specifications.

In the figures: 1. clamping finger; 2. support frame; 201. cover plate; 202. support base; 203. locking bolt; 204. locking nut; 205. L-shaped connecting plate; 3. connecting rod; 4. first pin shaft; 5. rocker; 6. second pin shaft; 7. bracket; 8. helical limiting rod; 9. third pin shaft; 10. slider; 11. linear motion unit.

DETAILED DESCRIPTION OF THE EMBODIMENTS

The present disclosure will be described further in detail below with reference to the accompanying drawings and embodiments, but the protection scope of the present disclosure is not limited thereto.

Figure 1:
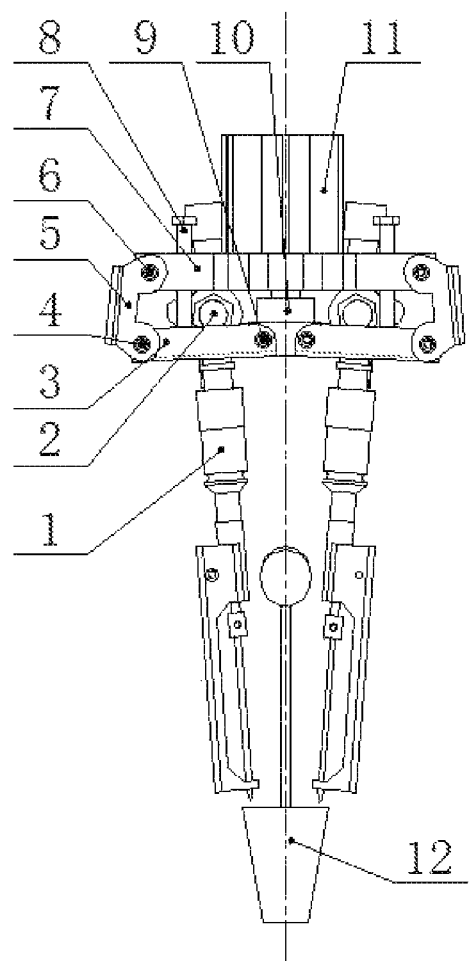
FIG. 1 is a schematic assembled structural view of an adjustable seedling pick-up end effector for automatically transplanting plug seedlings according to an embodiment of the present disclosure.
Figure 2:
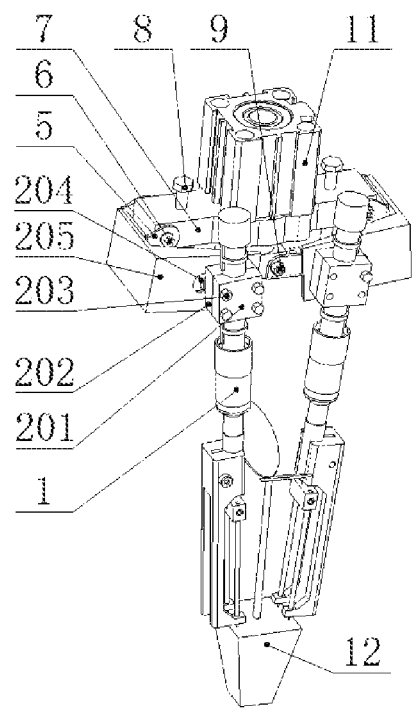
FIG. 2 is a schematic view showing connection between a support frame and a clamping finger according to an embodiment of the present disclosure.
Figure 3:
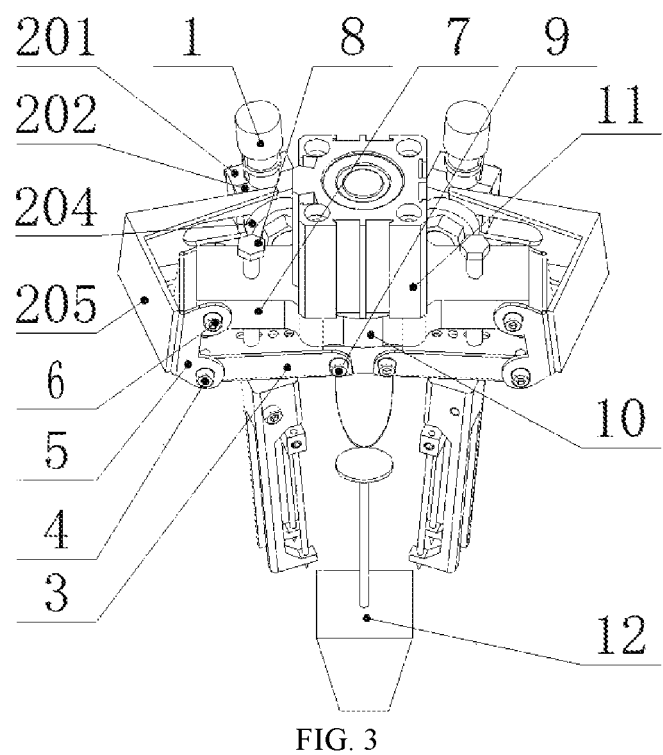
FIG. 3 is a schematic view showing connection between a support frame and a mechanical arm according to an embodiment of the present disclosure.

FIG. 1, FIG. 2, and FIG. 3 show a preferred embodiment of the adjustable seedling pick-up end effector for automatically transplanting plug seedlings. The adjustable seedling pick-up end effector for automatically transplanting the plug seedlings includes two clamping fingers 1 installed symmetrically along a direction of a center line, and further includes support frames 2 respectively connected adjustably to the clamping fingers 1 along the direction of the same center line and a mechanical arm fixedly connected to the support frames 2.

Figure 4:
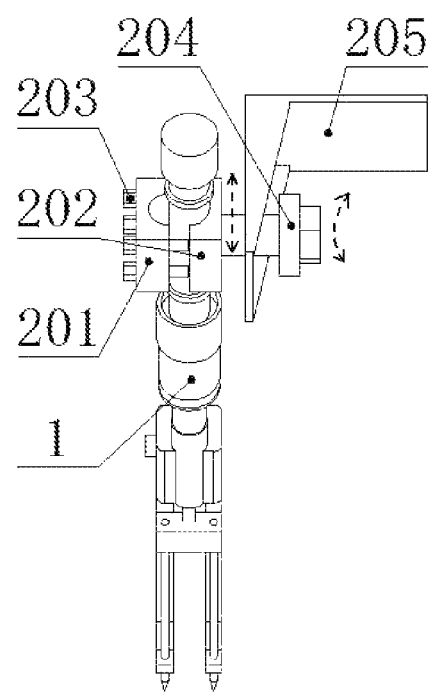
FIG. 4 is an exploded view showing installation of a clamping finger according to an embodiment of the present disclosure.
Figure 5:
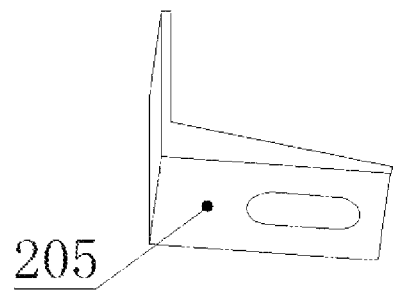
FIG. 5 is a schematic structural view of an L-shaped connecting plate according to an embodiment of the present disclosure.

FIG. 4 is an exploded view showing adjustable installation of the clamping finger 1. Each of the support frames 2 includes a cover plate 201, a support base 202, locking bolts 203, a locking nut 204, and an L-shaped connecting plate 205. The cover plate 201 and the support base 202 are in an interference fit with each other through the locking bolts 203 to fasten an upper end of the clamping finger 1. An adjustable slotted hole is provided on one end surface of the L-shaped connecting plate 205, as shown in FIG. 5, and the other end surface of the L-shaped connecting plate 205 is connected to the mechanical arm. A connecting end of the support base 202 extends through the adjustable slotted hole on the L-shaped connecting plate 205 in a clearance fit, and is connected to the L-shaped connecting plate 205 by tightening of the locking nut 204.

Figure 6:
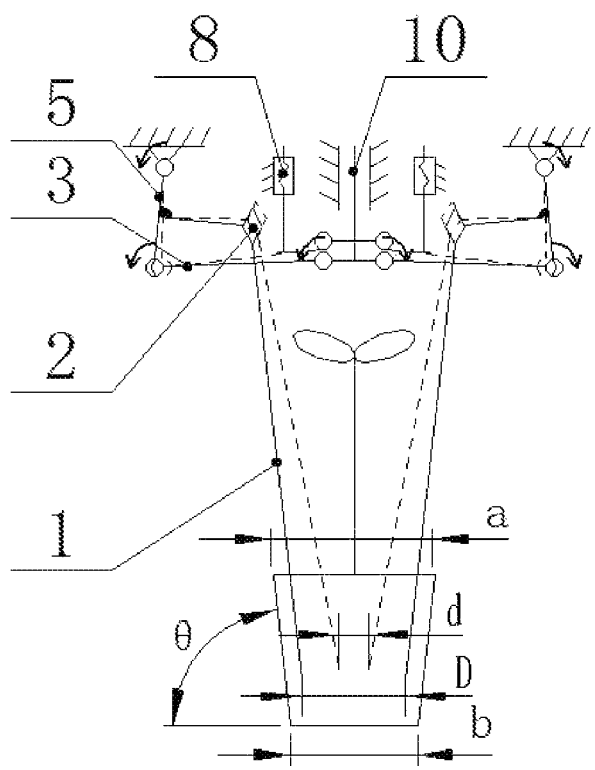
FIG. 6 is a simplified structural view of an adjustable seedling pick-up end effector for automatically transplanting plug seedlings according to an embodiment of the present disclosure.

FIG. 6 is a simplified structural view of the adjustable seedling pick-up end effector for automatically transplanting the plug seedlings. The mechanical arm is a retractable mechanism which can be folded inward and outward along the same center line, and includes connecting rods 3, first pin shafts 4, rockers 5, second pin shafts 6, a bracket 7, helical limiting rods 8, third pin shafts 9, a slider 10, and a linear motion unit 11. One end of each of the connecting rods 3 is hingedly connected to the slider 10 through the third pin shaft 9, the other end of each of the connecting rods 3 is hingedly connected to one end of a respective one of the rockers 5 through the first pin shaft 4, and the other end of each of the rockers 5 is hingedly connected to the bracket 7 through the second pin shaft 6. The helical limiting rods 8 extend through the bracket 7 in a manner of a helical pair along a direction parallel to the center line, and are configured to limit a movement space for closing of the connecting rods 3. The slider 10 is fixedly connected to a movable element of the linear motion unit 11 along the direction of the same center line. When the linear motion unit 11 drives the slider 10 to move upward, the connecting rods 3 drive the rockers 5 to cause the two clamping fingers 1 to close inward. When the linear motion unit 11 drives the slider 10 to move downward, the connecting rods 3 drive the rockers 5 to cause the two clamping fingers 1 to open outward.

According to this embodiment, preferably, the clamping fingers 1 are a clamping pin mechanism configured to be inserted into a root lump or a clamping claw configured to clamp a stem of a plug seedling.

The cover plate 201 and the support base 202 are respectively provided with slot holes which form an identical shape to the upper end of the clamping finger 1 to fasten the upper end of the clamping finger 1.

A size of a locking end surface of the locking nut 204 is larger than a size of the slotted hole on the L-shaped connecting plate 205. The L-shaped connecting plate 205 is fixedly connected to the corresponding rocker 5 of the mechanical arm by welding.

The connecting rods 3, the rockers 5, the slider 10, and the bracket 7 are hingedly connected to each other through the first pin shaft 4, the second pin shaft 6, and the third pin shaft 9, to construct an eccentric slider-rocker mechanism which is configured to be folded inward and outward to be closed and opened along the same center line with the bracket 7 as a stationary frame, the slider 10 as a driving part, and the connecting rods 3 and the rockers 5 as driven parts, and a closure ultimate position of the connecting rods 3 is limited by a limiting function of the helical limiting rods 8.

The clamping fingers 1 are respectively fixed to the rockers 5 of the mechanical arm through the connection of the support frames 2, and can be opened and closed to a great extent under driving of the slider 10 to perform actions of prying, grabbing and quickly releasing the plug seedling 12.

According to this embodiment, preferably, the linear motion unit 11 is a linear motion cylinder, a hydraulic cylinder, a linear motor, or an electric linear actuator.

Figure 7:
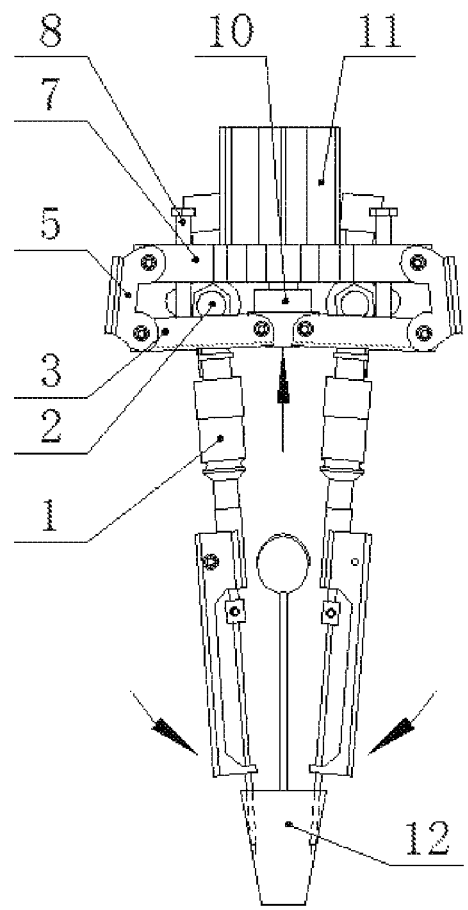
FIG. 7 is a schematic view of an adjustable seedling pick-up end effector operating in a root lump grabbing state according to an embodiment of the present disclosure.

Specifically, to execute a seedling pick-up operation for automatic transplanting, first, a connection orientation of each of the clamping fingers 1 on a respective one of the support frames 2 is adjusted according to dimensions of cells in a plug tray, for example, dimension a, dimension b, and angle θ shown in FIG. 6, thereby adjusting the distance between the clamping fingers 1. Then according to an amount of clamping deformation of the plug seedling, for example, a deformation from dimension D to dimension d as shown in FIG. 6, the closure limiting effect of the helical limiting rods 8 on the connecting rods 3 is adjusted, so that the opening degree and the clamping angle of the clamping fingers 1 as well as the amount of clamping deformation can all meet the requirements of aligning the clamping fingers 1 with a cell to clamp the plug seedling 12. Then, the seedling pick-up end effector is driven by a seedling pick-up mechanism of an existing automatic transplanter to reach a position which is exactly above the plug seedling 12. The clamping fingers 1 are inserted into a root lump of the plug seedling 12. The linear motion unit 11 pulls the slider 10 upward, as shown in FIG. 7. Then, through the transmission of the eccentric slider-rocker mechanism that is folded inward to be closed along the same center line, the clamping fingers 1 execute an action of prying and grabbing the plug seedling 12. Finally, the seedling pick-up end effector is driven by the seedling pick-up mechanism of the existing automatic transplanter to grab the plug seedling 12 from the cell of the plug tray.

Figure 8:
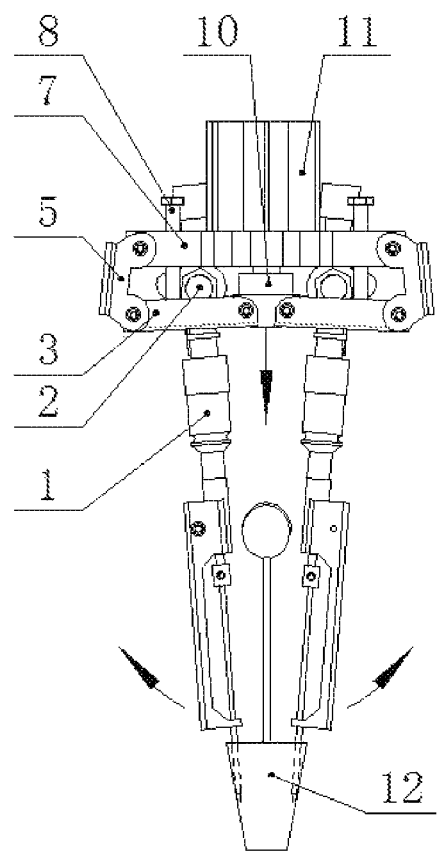
FIG. 8 is a schematic view of an adjustable seedling pick-up end effector operating in a root lump releasing state according to an embodiment of the present disclosure.

Specifically, to execute the seedling dropping operation for automatic transplanting, when the seedling pick-up end effector is driven by the seedling pick-up mechanism of the existing automatic transplanter to reach a position which is exactly above a planter, the linear motion unit 11 pushes the slider 10 downward, as shown in FIG. 8. Then, through the transmission of the eccentric slider-rocker mechanism that is folded outward to be opened along the same center line, the clamping fingers 1 release the plug seedling 12 to execute an action of quickly releasing the plug seedling 12.

The mechanical arm of the present disclosure is an eccentric slider-rocker mechanism which can be folded inward and outward to be closed and opened to drive the clamping pin mechanism to execute actions of prying, grabbing and quickly releasing the plug seedlings so as to achieve active opening and closing to grab and release the plug seedlings, and provide a larger space to accommodate plug seedlings so as not to damage the seedlings. The present disclosure adopts an adjustable slotted hole and a locking device, i.e., the helical limiting rods 8, to realize the adjustment of the opening degree and the clamping angle of the clamping pin mechanism, which can meet the seedling pick-up requirements for automatic transplanting of plug seedlings of various specifications.

The detailed descriptions listed above are merely specific illustrations of feasible embodiments of the present disclosure, and the protection scope of the present disclosure is not limited thereto. Equivalent embodiments or changes can be made without departing from the technical spirit of the present disclosure, which are all embraced in the protection scope of the present disclosure.

What is claimed is:

1. An adjustable seedling pick-up end effector for automatically transplanting plug seedlings, comprising two clamping fingers, support frames, and a mechanical arm, wherein the two clamping fingers are installed symmetrically along a direction of a center line; one end of each of the support frames is connected to an upper end of a respective one of the two clamping fingers, an other end of each of the support frames is connected to a respective one of rockers of the mechanical arm, and a slotted hole is provided on the end of each of the support frames for adjusting a distance between the two clamping fingers;

each of the support frames comprises a cover plate, a support base, locking bolts, a locking nut, and an L-shaped connecting plate; wherein the cover plate and the support base are respectively arranged on two sides of the upper end of the respective one of the two clamping fingers and are connected by the locking bolts to fasten the respective one of the two clamping fingers; one end surface of the L-shaped connecting plate is provided with the slotted hole, and an other end surface of the L-shaped connecting plate is connected to the respective one of the rockers of the mechanical arm; a connecting end of the support base is passed through the slotted hole and is connected to the L-shaped connecting plate by a tightening of the locking nut;

the mechanical arm comprises connecting rods, the rockers, a bracket, helical limiting rods, a slider, and a linear motion unit; the slider is connected to a movable element of the linear motion unit along the direction of the center line; the connecting rods are respectively arranged on two sides of the slider, one end of each of the connecting rods is hingedly connected to the slider, an other end of each of the connecting rods is hingedly connected to one end of the respective one of the rockers, and an other end of each of the rockers is hingedly connected to the bracket; the helical limiting rods each extend through the bracket in a manner of a helical pair along a direction parallel to the center line and are configured to limit a movement space for closing the connecting rods; when the linear motion unit drives the slider to move upward, the connecting rods drive the rockers to cause the two clamping fingers to close inward; and when the linear motion unit drives the slider to move downward, the connecting rods drive the rockers to cause the two clamping fingers to open outward; and the mechanical arm is an eccentric slider-rocker mechanism configured to be closed and opened along the center line with the bracket as a stationary frame, the slider as a driving part, and the connecting rods and the rockers as driven parts, and the eccentric slider-rocker mechanism is configured to limit a closure ultimate position of the connecting rods by a limiting function of the helical limiting rods.

2. The adjustable seedling pick-up end effector for automatically transplanting the plug seedlings according to claim 1, wherein the end of each of the connecting rods is hingedly connected to the slider through a third pin shaft, the other end of each of the connecting rods is hingedly connected to the end of the respective one of the rockers through a first pin shaft, and the other end of each of the rockers is hingedly connected to the bracket through a second pin shaft.

3. The adjustable seedling pick-up end effector for automatically transplanting the plug seedlings according to claim 1, wherein the two clamping fingers are a clamping pin mechanism configured to be inserted into a root lump or a clamping claw configured to clamp a stem of a plug seedling.

4. The adjustable seedling pick-up end effector for automatically transplanting the plug seedlings according to claim 1, wherein the cover plate and the support base are respectively provided with slot holes, the slot holes form an identical shape to the upper end of the respective one of the two clamping fingers to fasten the upper end of the respective one of the two clamping fingers.

5. The adjustable seedling pick-up end effector for automatically transplanting the plug seedlings according to claim 1, wherein a size of a locking end surface of the locking nut is larger than a size of the slotted hole on the L-shaped connecting plate.

6. The adjustable seedling pick-up end effector for automatically transplanting the plug seedlings according to claim 1, wherein the L-shaped connecting plate is fixedly connected to the respective one of the rockers of the mechanical arm.

7. The adjustable seedling pick-up end effector for automatically transplanting the plug seedlings according to claim 1, wherein the two clamping fingers are respectively connected to the rockers of the mechanical arm through the support frames and are configured to be opened and closed under a driving of the slider to perform actions of grabbing and releasing a plug seedling.

8. The adjustable seedling pick-up end effector for automatically transplanting the plug seedlings according to claim 1, wherein the linear motion unit is a linear motion cylinder, a hydraulic cylinder, a linear motor, or an electric linear actuator.

\* \* \* \* \*